Patented June 6, 1933

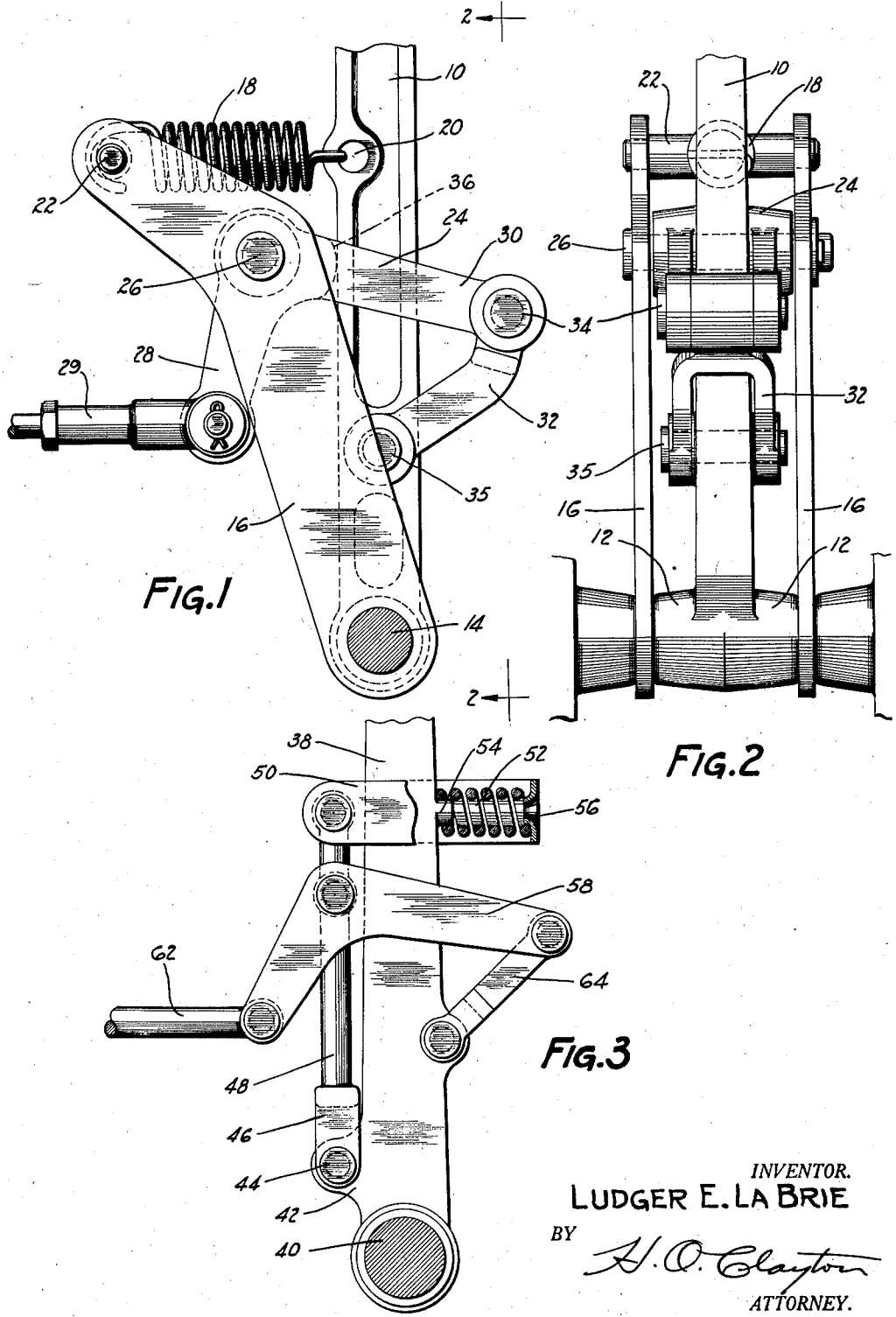

1,912,778

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed February 13, 1929. Serial No. 339,543.

This invention relates to brakes and is illustrated as embodied in a novel leverage adjusting device adapted to be included in the conventional operating connections or so-called hookup of the braking system.

An object of the invention is to decrease the travel of the service pedal or other brake applying means in the operation of applying the brake by incorporating in a system a mechanism which will operate to automatically give a predetermined brake applying leverage after the slack in the system has been taken up.

A considerable portion of the necessary pedal travel in the average car on the road may be attributed to the slack in the system, the latter being due in large measure to permissible tolerances in the parts, improper fits, and natural wear. The ratio of the total movement of the pedal to the movement of the actuating element within the brake proper is often as high as 20 to 1, made necessary in order to permit the slack-consuming movement of the pedal.

By my invention I propose to obviate this lengthy pedal movement by first reducing the mechanical advantage of the hookup to say 10 to 1, thereby reducing the pedal travel necessary in effecting the slack take-up, and to then compensate for this leverage loss by incorporating in the system my novel leverage booster to give the proper total resultant leverage.

A further object of my invention relates to means for increasing the leverage of the hook-up in direct proportion to the increase in pressure applied to the brake pedal and I prefer but not necessarily so, that this action take place after the brake lining comes into drum contact.

In one desirable embodiment I provide, preferably at the junction of the service pedal and its pull rod to the rock shaft, an assembly of bell crank levers so arranged with respect to each other and to the associated rod and pedal lever as to effect, with application of the pedal, the result desired.

Important features of the invention are the arrangement of the levers to obviate any change in angularity of the pull rod with respect to the chassis, after the brake is applied; to the novel toggle construction involving the arrangement of the pedal lever with the means connecting it to one of the bell cranks, which toggle is adapted to perform the desired function of stepping up the leverage at the desired time; to an alternative construction embodying one instead of two bell crank levers in combination with a bar pivoted to the pedal lever, which bar is yieldingly held in contact with the pedal lever by a spring under compression; and to various other features, refinements of considerable merit, constructions and combinations of parts which will be apparent from the following description of the illustrative embodiments shown in the accompanying drawing, in which:

Figure 1 is a side elevational view of the lever mechanism of my invention and associated parts;

Figure 2 is an end elevation of Figure 1 looking in the direction of the arrows 2—2; and Figure 3 is a view similar to Figure 1 indicating a modified form of my invention.

In that embodiment of my invention disclosed in Figures 1 and 2 the reference numeral 10 indicates the service pedal lever provided with tapered hubs 12 pivoted, as is usually done, on the shaft bearing 14 mounted on the transmission housing. Pivotally mounted on shaft 14 on either side of the pedal lever are bell crank levers on angular straps 16 extending upwardly at an acute angle to said pedal lever and connected thereto at their ends by a tension spring 18, the latter hooked to an opening 20 in the pedal lever and to a pin 22 connecting the straps.

I further propose to pivotally mount a bell crank lever 24 on a pin 26 connecting the straps 16 at a point thereon located approximately two-thirds the length of the strap. The short end 28 of the bell crank 24 may be pivoted to the clevised end 25 of the usual connecting reach rod 29 attached to the rock shaft of the brake structure and the longer end 30 is preferably bifurcated to straddle the pedal arm. An angular link 32 may be pivotally connected at one end to pin 34 connecting the ends of the furcation 30 and its other end is preferably bifurcated and pivoted to the pedal arm by pin 35. A rounded portion 36 on bell crank 24 functions as a stop against the pedal lever in "brake off" position, keeping spring 18 under tension.

The distances of pivot pins 26 and 34 from the longitudinal center of the pedal lever are preferably made approximately equal as are those between pins 22 and 26 and between pin 35 and the center of shaft 14.

In operation, my novel combination of levers functions as a rigid unit or closed system until the slack is consumed and the brake lining actually in substantial contact with the drum. The tensioned spring 18 is purposely made strong enough to prevent its being further stretched during this phase of the operation. Once the lining is in drum contact and the slack in the system is consumed my novel mechanism comes into play. Further movement of the pedal is resisted by the tensioned reach rod as the lining is forced against the revolving drum, the tension spring 18 being elongated. The straps 16 pivot about shaft 14 carrying with them the bell crank lever 24, the pivot point 35 being the apex of a toggle defined by the lower end of the pedal lever and the link 32, which toggle is straightened out during the pedal movement. The arrangement is such that the movement ratio of the reach rod with respect to the pedal decreases as the pedal movement increases, thus insuring a more powerful brake application.

In Figure 3 I have disclosed a modified form of my invention functioning in a manner similar to the embodiment previously described. The pedal lever 38 is pivoted as usual on the shaft 40 and is further provided with a boss 42 and pin 44 therein, upon which the clevised end 46 of a bar 48 is pivoted. A U-shaped strap 50 is preferably pivoted at one end to the bar 48 and straddles the pedal lever. A compression spring 52 is confined between a lug 54 on the pedal and a tubular protrusion 56 at the base of the U strap, which spring functions in a manner similar to spring 18 previously described, in obviating relative movement between the parts during the slack consuming movement. A bell crank lever 58, bifurcated in its long arm to straddle the pedal lever, is pivoted at its long and short ends to a link 64 and the reach rod 62 respectively. The link 64 connects the bell crank with the pedal, being pivotally connected to both.

In operation the bar, bell crank and link move with the pedal as a unit during the lining clearance and slack consuming movement and thereafter step up the mechanical advantage of the hook-up in a manner previously described. Spring 52 functions in compression, whereas spring 18 functions in tension; otherwise the action is substantially the same in the two modifications.

While several illustrative embodiments have been described in detail, it is not my intention to limit the scope of the invention to those particular embodiments or otherwise than by the terms of the appended claims.

I claim:

1. A brake operating means, including a service pedal lever, a plurality of levers, connected to the service pedal lever, a tension member connecting one of the levers to the service pedal lever and a rod connecting the other lever with the brake.

2. Brake operating means for effecting a predetermined leverage comprising a pedal lever, a plurality of pivotally connected levers, one of said levers pivotally connected at one of its ends to the pedal lever at its fulcrum and at its other end to a spring tension means connected to said pedal lever and the other lever pivotally connected to the first mentioned lever, a link connecting one end of the second mentioned lever to the pedal lever and a reach rod connected to the other end of the second mentioned lever.

3. A brake operating mechanism for use with a service pedal lever which increases its leverage in proportion to a predetermined relative movement of its parts comprising two bell crank levers pivoted together, one of said levers pivoted for rotation about an axis passing through a point within the outline of the service pedal lever, the other of said levers linked to said service pedal lever and a tension member connecting one of the levers to the service pedal lever.

4. A brake operating means comprising a pedal lever and a pair of pivotally connected levers, one of said levers being pivotally connected to the pedal lever at its fulcrum, a link connecting the other of said pair of levers with said pedal lever to form therewith a toggle, and means comprising a tension member for connecting the first mentioned lever to the pedal lever.

5. A brake operating mechanism comprising in combination, a pedal arm and a pair of levers, one of said levers being pivotally connected at one end to the pedal lever, means comprising a spring for connecting the other end of the lever to the pedal lever, the other lever being pivotally connected to the first mentioned lever, a link connecting the second mentioned lever to the pedal lever, and a reach rod connected to the second mentioned lever.

6. A brake operating means comprising a pedal lever, a lever having one end pivoted to the pedal lever, means comprising a spring for connecting the other end of the lever to the pedal lever, a second lever pivoted to the first mentioned lever, a link connecting the second mentioned lever to the pedal lever and a reach rod connected to the second mentioned lever.

CERTIFICATE OF CORRECTION.

Patent No. 1,912,778. June 6, 1933.

LUDGER E. LA BRIE.

It is hereby certified that error appears in the printed specification of the above numbered patent requiring correction as follows: Page 2, after line 110, insert the following as claim 5:

5. A brake operating means comprising a pedal lever, a bell crank lever having one arm pivoted at the fulcrum of the pedal lever, a tension member connecting the other end of the bell crank lever to the pedal lever, a second bell crank lever pivoted to the first bell crank lever, a link connecting one arm of the second lever to the pedal lever, and a reach rod connected to the other arm of the second bell crank lever.

Pages 2 and 3, claims now appearing in the patent as numbers "5, 6, 7, 8, 9, 10, 11, 12, 13 and 14", should bear the numbers respectively, "6, 7, 8, 9, 10, 11, 12, 13, 14 and 15"; and that the said Letters Patent should be read with these corrections therein that the same may conform to the record of the case in the Patent Office.

Signed and sealed this 15th day of August, A. D. 1933.

M. J. Moore.

(Seal) Acting Commissioner of Patents.

CERTIFICATE OF CORRECTION.

Patent No. 1,912,778.  June 6, 1933.

LUDGER E. LA BRIE.

It is hereby certified that error appears in the printed specification of the above numbered patent requiring correction as follows: Page 2, after line 110, insert the following as claim 5:

5. A brake operating means comprising a pedal lever, a bell crank lever having one arm pivoted at the fulcrum of the pedal lever, a tension member connecting the other end of the bell crank lever to the pedal lever, a second bell crank lever pivoted to the first bell crank lever, a link connecting one arm of the second lever to the pedal lever, and a reach rod connected to the other arm of the second bell crank lever.

Pages 2 and 3, claims now appearing in the patent as numbers "5, 6, 7, 8, 9, 10, 11, 12, 13 and 14", should bear the numbers respectively, "6, 7, 8, 9, 10, 11, 12, 13, 14 and 15"; and that the said Letters Patent should be read with these corrections therein that the same may conform to the record of the case in the Patent Office.

Signed and sealed this 15th day of August, A. D. 1933.

M. J. Moore.

(Seal) Acting Commissioner of Patents.